May 14, 1957     J. CAUFFIEL     2,792,164
PREFORMED STRUCTURAL UNITS
Filed Aug. 10, 1951     3 Sheets-Sheet 1
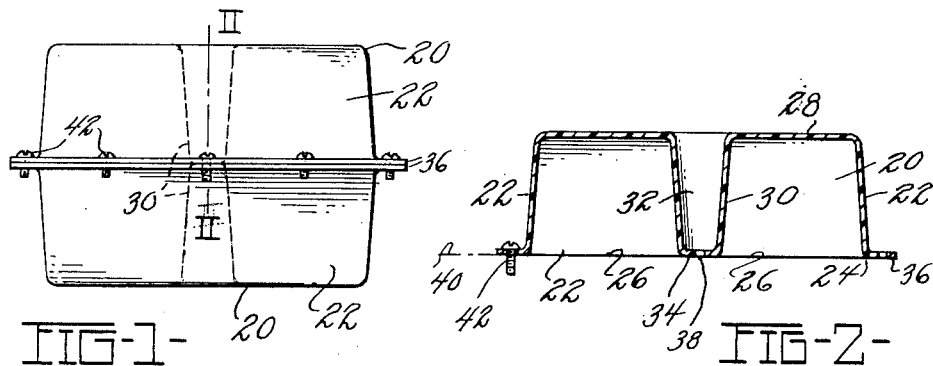
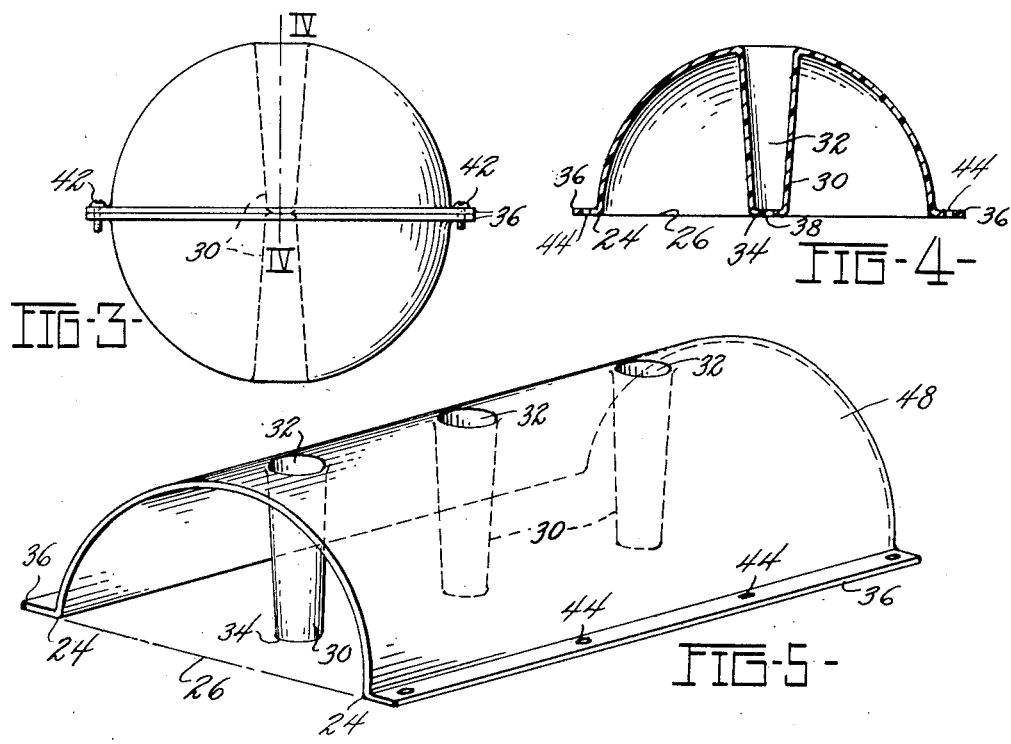
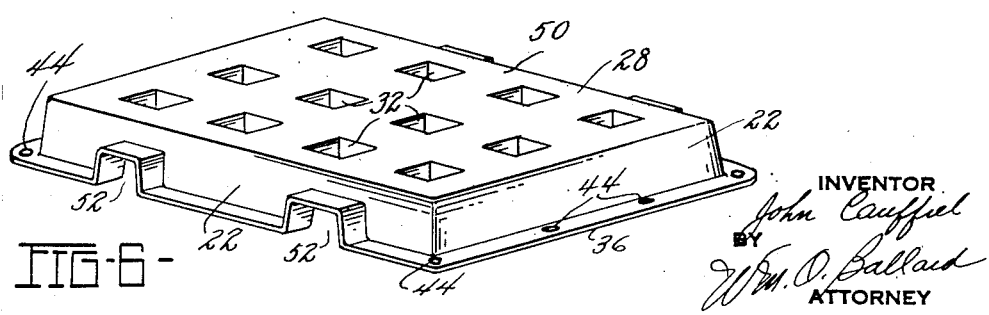
INVENTOR
John Cauffiel
BY
Wm. O. Ballard
ATTORNEY May 14, 1957 J. CAUFFIEL 2,792,164
PREFORMED STRUCTURAL UNITS
Filed Aug. 10, 1951 3 Sheets-Sheet 2
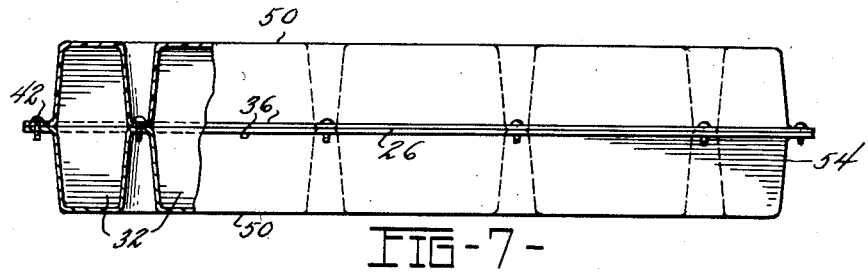
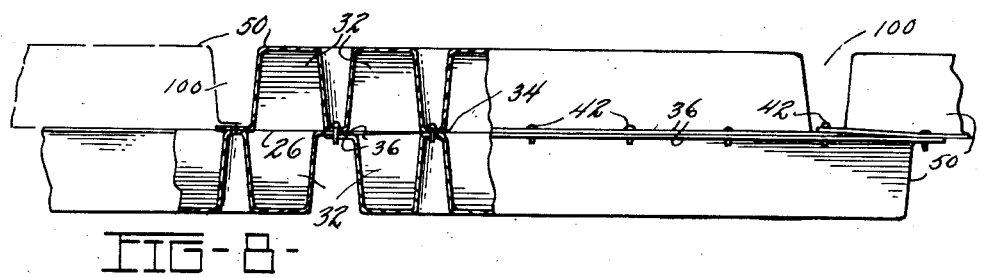
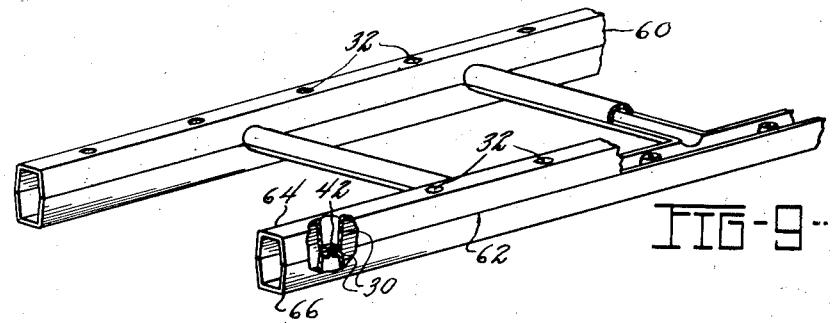
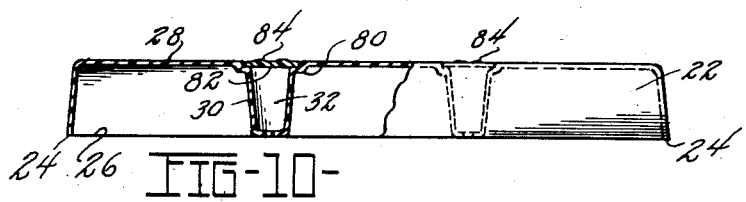
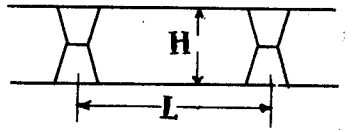
INVENTOR
John Cauffiel
BY
Wm. O. Ballard
ATTORNEY May 14, 1957 J. CAUFFIEL 2,792,164
PREFORMED STRUCTURAL UNITS
Filed Aug. 10, 1951 3 Sheets-Sheet 3
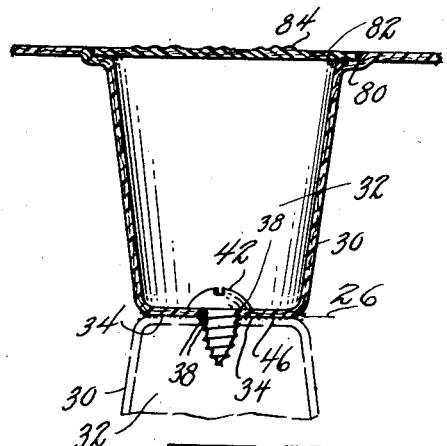
FIG-13-
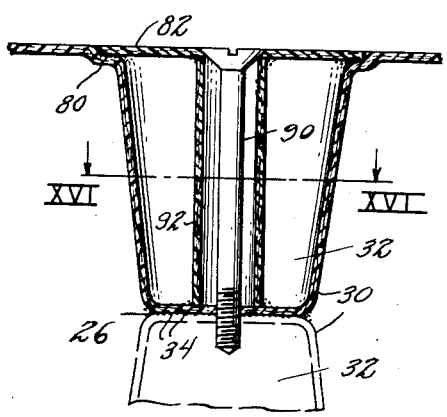
FIG-14-
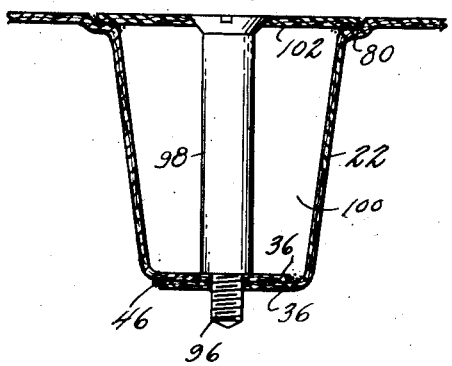
FIG-15-
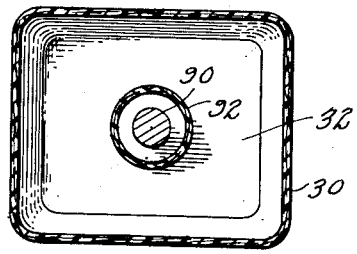
FIG-16-
INVENTOR
John Cauffiel
BY
Wm. O. Ballard
ATTORNEY United States Patent Office 2,792,164
Patented May 14, 1957

2,792,164

PREFORMED STRUCTURAL UNITS

John Cauffiel, Toledo, Ohio

Application August 10, 1951, Serial No. 241,281

1 Claim. (Cl. 228—58)

This invention relates to molded reinforced plastic structural shapes.

An object of this invention is to provide a pre-shaped unit of substantial rigidity and structural strength which may be configured to serve as an independent structural unit such as a panel or tray or may be assembled with other units to form complete bodies or sections of other structures.

Another object of this invention is to provide a basic pattern for a family of structural shapes molded and pressed from resins reinforced with various fibers, particularly glass fibers.

Another object of this invention is to provide a pattern for molded and pressed reinforced plastic units, which units may be readily incorporated into structures of various types or assembled into complete useful products.

Another object of this invention is to provide structural units embodying maximum physical and fabricating properties with minimum weights, incorporating strength-weight ratios, impact resistance, dimensional stability, weather and temperature resistance with other desirable characteristics.

Still another object of this invention is the incorporation of a simple reinforcing pattern which not only eliminates intricacy of parts but lends itself to cooperation with like parts in multiplying the individual unit strength within bodies fabricated from complementary units.

And another object of this invention is the production of structural units embodying a common basic pattern which aids in the installation or assembly of the units into completed structures.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 1 is a side elevation of a single cell assembly from a pair of units embodying the invention herein, the cell being of cubicle form;

Fig. 2 is a section on the line II—II, Fig. 1;

Fig. 3 is a side elevation of a modified or spherical form of a single cell assembly of units of the invention herein;

Fig. 4 is a view on the line IV—IV, Fig. 3;

Fig. 5 is a perspective view of a semi-cylindrical unit embodying an expanded form of the invention herein;

Fig. 6 is a perspective view of a unit of the invention in panel form;

Fig. 7 is a side elevation showing the assembly of a pair of the panel form units to form a hollow body of general panel form;

Fig. 8 is a side elevation showing the assembly of a plurality of the panel units into a continuing structure such as a deck or aeroplane landing strip;

Fig. 9 is a perspective view of a structure, herein shown as a ladder, embodying a pair of preformed units assembled which embodies an elaboration of the pattern within the single cell units as illustrated in Figs. 1 through 4;

Fig. 10 is a side elevation of a panel unit, parts being broken away, showing means for not only masking the reinforcing cavities and unit assembly elements, but providing ornamentation for the surfaces of assembled bodies;

Fig. 11 is a cross-section through an aerofoil showing how the invention may be adapted for fabrication of bodies embodying unlike but complementary shaped units;

Fig. 12 is a diagrammatic showing of a modified form of assembly adapted for the production of structural elements such as box beams, trusses and the like;

Fig. 13 is an enlarged section through a pair of abutting reinforcing cavities illustrating a method of permanent assembly therefor;

Fig. 14 is a view similar to Fig. 13 showing a modified form of interlocking means;

Fig. 15 is a view similar to Fig. 13 illustrating an additional modified form of unit assembly; and Fig. 16 is a view on the line XVI—XVI, Fig. 14.

Materials adapted for the units herein disclosed are selected from economically satisfactory raw materials in the plastic and fiber fields, more particularly resins and glass fibers. The basic pattern which is utilized throughout this disclosure is one which is not readily adapted for commercial production by casting or stamping but can be satisfactorily produced by molding and pressing techniques. The resultant units embody the strength and advantages of most metals with the added features found in the use of molded plastics.

To reduce the pattern to its more simple form wherein units may be fabricated and assembled into regular geometric bodies, reference is made to the drawings, Figs. 1 and 2. A bowl-shaped or shell-like comparatively thin wall unit 20 is molded to provide side wall portions 22 which define the peripheral shape herein shown as regular polygons. The side wall 22 has its free edge or perimeter 24 disposed in a plane 26. The side wall 22 defines the body's lateral outline and merges into base or face portion 28. These walls 22, 28, determine the surface dimensions and contour of the unit which may be defined as hat-shaped, cup-shaped, tray-like or even irregular forms.

The surface area of the main portion 28 is provided with one or more reentrant portions 30 each forming a cup-shaped cavity 32 projecting inwardly from the surface of the unit 20. These frustro-conical inward projections serve as integral reinforcing portions. A preferred form of these reinforcements is herein shown as hollow truncated conical indentations with terminal or interior peak faces 34 of substantial areas and disposed on the plane 26.

Additionally, the perimeter 24 may be provided with an integral outwardly extending peripheral flange having its upper or outer face also lying substantially within the plane 26.

The terminal faces of the indentations may be provided with an aperture 38 therethrough, the purpose of which will hereinafter be more thoroughly described.

A more simple body form such as a semi-cube or half of a regular polygonal body may be used as a panel or cap element and attached to a foundation 40 by means of a screw-like element 42 extending through the aperture 38 while similar openings 44 may be conveniently disposed about the flange 36.

Block or hollow body structures 44 may be assembled by uniting two of the units 20 together (Fig. 1). The faces of the units lying within the plane 26 may be coated with an adhesive 46 and pressed together. The structure may then be cured so that the resultant body is an integral unit. Two registering apertures 38 of abutting flange faces 34 and the registering apertures 38 form starting seats for the screw-like elements 42 which may be self-tapping screws or bolts which anchor the units together in addition to the adhesives. The adhesive may be omitted if there is any reason for anticipating separation of the units as for example when structures housing mechanisms likely to require service are assembled. The polygonal block may be assembled into any structure susceptible of fabrication from units of this general type.

The primary or regular geometric forms of the units 20 may assume the shape of hemispheres (Figs. 3, 4) and when two are correctly joined together, a sphere or ball results (Fig. 3). The character of the materials used permits such resultant structures to be used as floats. The cavities provided by the reinforcing indentations provide ample space to receive fittings whereby the structure can be mounted in useful positions in such assemblies as toilet operating mechanisms and other like assemblies.

The single cell assemblies may have their exterior forms designed to fit a particular purpose. Such single cell units require but a single reinforcing inset providing the overall dimensions are kept within the reinforcing range of the single indentation.

The features within the basic one cell construction may be extended or enlarged, wherein the dimensions and contour of a proposed article require added reinforcement, as for example, a tubular construction (Fig. 5). A semi-cylindrical unit 48 is prepared with a plurality of reentrant frustums 30 regularly spaced in alignment therealong and two of the units may be cemented and locked together to form a tubular structure.

Continuing this expansion from the single cell, panels 50 can be fabricated and the cavities 32 distributed in regularly spaced intersecting rows of such numbers as the finished article may require for a predetermined rigidity. The cavities may be of frusto-conical form or may assume the shapes of truncated pyramids or other convenient geometrical shapes. These forms will be dictated by the characteristics sought within the final fabrication. These panels are suitable for many purposes including wall panels for trucks, floors, platforms and as herein shown (Fig. 6) pallets upon which merchandise may be stacked and the pallets shifted with its load by tractors. Entrance ways 52 are formed along the walls 22 to receive the elevator tines of the tractor carried fork.

Suspending means, as cables, may be attached to selected apertures 44 so that the panel type unit can serve as a suspended platform such as commonly used by linesmen. These panels also serve as walls and flooring, providing excellent heat insulation as well as space for service conduits therethrough. They are adaptable for use wherever light weight rugged surface construction is desired, such as aeroplane floors and the like.

Panel units assembled in pairs form hollow bodies 54 (Fig. 7) which serve as floats, rafts and similar marine equipment or such assemblies may provide double insulation panels.

The panel units with their regularly spaced and aligned reinforcing frustums serve particularly well in the paving of landing fields. In fact, the primary purpose of this disclosure is the production of light weight units capable of being flown in quantities into areas for the rapid laying of decks and landing stretches of any size. A field formed from the units herein has all the advantages of metallic units, plus the saving in weight and ease of transportation and assembly. These units can be nested like egg cartons, in stacks of large area covering bundles and flown into locations where landing fields are to be constructed, dropped from transport planes and quickly assembled to provide acceptable ports for aircraft.

It can be noted here that a cross-section through assembled panels of the type herein approaches truss or girder constructions recognized for their impact resistance and supporting strength, and a multiplication of the units indefinitely continued to produce any desired area.

With reference to Fig. 8 of the drawings, a typical assembly pattern is illustrated for a continuing pavement pattern suitable as a landing field. A lower or base level of units 50 is spread over the terrain with the cavities 32 upwardly open in the plane 26 with the frustum faces 34 and flanges 36 also disposed in the plane 26. The units are preferably placed to have the flanges 36 of adjacent units overlapping. An upper layer or field surface forming units are then mounted on top of the base layer in reverse position, and due to the fact that the reinforcing frustums and flanges are regularly spaced and in alignment with the apertures in the flanges, the flanges and frustums will register as will the apertures therethrough. Self-tapping screws or similar connectors can then be set in a predetermined pattern over the covered area to lock the units into an integral pavement. Before the upper units are positioned over the base set, the frustum faces and flanges may be coated with a suitable adhesive 46 so that the completed body is spliced and sealed making the same weatherproof.

As the reinforcing frustums and flanges register, so the apertures 38, 44 also register and serve to aid in a quick initial positioning of the locking elements 42.

This family of molded fiber impregnated resin shapes are comparable to steel structural shapes and the invention may be carried over from the regular geometrical forms hereto discussed to other shaped structures and a typical example is herein shown in Fig. 9, illustrating a ladder embodying the basic pattern.

A form, of which the ladder 60 is an example is divided by the medial plane 26. The structural halves 64, 66, which in this type of structure are identical in form are molded to include one half of the side supports and one half of the rungs. The frustums 30 are strategically placed along the units and the two half elements locked together by adhesive and fastening devices.

In the structures herein, the adhesive 56 is preferably the resin used in the plastic bodies so that when cured, a unitary overall structure results.

It is obvious the two separate molded elements may have different contours away from the perimeters such as is shown in Fig. 11, wherein the two cooperative sections provide the upper and lower surfaces of an aerofoil 70. Here again, the frustums reinforce the complete article and are of different dimensions, yet all having their upper base faces 38 substantially in the plane 26. The same assembly methods may be used but in this form as in other shapes, the flanges 36 are omitted but the perimeters register and are sealed together.

This structural development may be carried on into the production of structural beams, etc., as shown in Fig. 12 which diagrammatically illustrates the assembly of a pair of molded elements into a box beam of predetermined thickness "H" which embodies the strength of a metallic beam of like dimensions yet with only a fraction of the weight. The reinforcement is determined by the distance "L" between the reinforcing frustums.

The exposed areas or surfaces of the structures are pocketed by the frustum cavities 32 and in some instances it may be desirable to have the exposed surface continuous. To this end, the upper perimeters of the cavities are provided with peripheral seats 80 into which a plate or disk 82 may be seated and adhesively attached. These elements 82 may carry embossings or other decorations 84 thereby lending a unique design to the overall surface. For example, a refrigerator cabinet constructed hereunder may be given an attractive and unusual appearance by the decorative closures 82 masking the cavities 32.

The size of the units, the thickness of the shell walls and the cross-sectional shapes of the frustums are all predetermined by the object to be constructed and the utilities expected therefrom. For example, an insulation panel may be but a fraction of an inch thick overall or a float made of cooperating units can be several feet thick and the area is limited only by the limits imposed in molding or pressing such as the capacity of the apparatus employed or the curing devices available.

The thickness of the shell units can also vary from a few thousandths of an inch upward.

Various forms of interlocking elements are adaptable to meet various requirements of assembly of the units. The faces 34 of the abutting frustums may be held together by adhesives 46 and the registering apertures 38 serve as a starting seat for a self-tapping screw 42 which when seated can be masked by a closure plate 82 seated in the cavity entrance (Fig. 13). Or a screw 90 may extend through the disk 82, axially of the cavity 32 and through a pair of abutting faces 34 with a spacer 92 about the screw to prevent any distortion of the closure disk (Fig. 14). Or a screw 96 may be employed having a shank 98 serving in place of the spacer collar 92 (Fig. 15). In continuing structures, the spaces 100 between adjoining sections may also be masked by the use of strips 102.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and desired to secure by United States Letters Patent:

A ladder formed from a pair of molded fiber reinforced resin shells, each shell comprising a ladder section representing one-half of a longitudinal section of said ladder, including the side rails and rungs, each section comprising a shell-like construction of overall substantially constant thickness including a cup-shaped body defining side rails and rungs and having a rim disposed along the same plane with re-entrant portions in the side rail portions terminating on said plane, and means locking said rails together to form a complete ladder.

References Cited in the file of this patent

UNITED STATES PATENTS

| | | |
|---|---|---|
| 1,277,622 | Madison | Sept. 3, 1918 |
| 1,344,767 | Madison | June 29, 1920 |
| 1,518,639 | Reamer | Dec. 9, 1924 |
| 1,694,400 | Sjolin | Dec. 11, 1928 |
| 2,237,329 | Bischof | Apr. 8, 1941 |
| 2,294,333 | Fay | Aug. 25, 1942 |
| 2,298,001 | Fay | Oct. 6, 1942 |
| 2,495,640 | Muskat | Jan. 24, 1950 |

FOREIGN PATENTS

| | | |
|---|---|---|
| 578,042 | Germany | June 9, 1933 |
| 793,334 | France | Nov. 16, 1935 |
| 450,524 | Great Britain | Apr. 23, 1935 |

OTHER REFERENCES

"Plastics," February 1948, page 34.
"Plastics Industry," February 1951, page 27.